Dec. 17, 1929.　　　G. R. BALDWIN　　　1,739,568
PRESSURE ALARM DEVICE
Filed Sept. 22, 1928
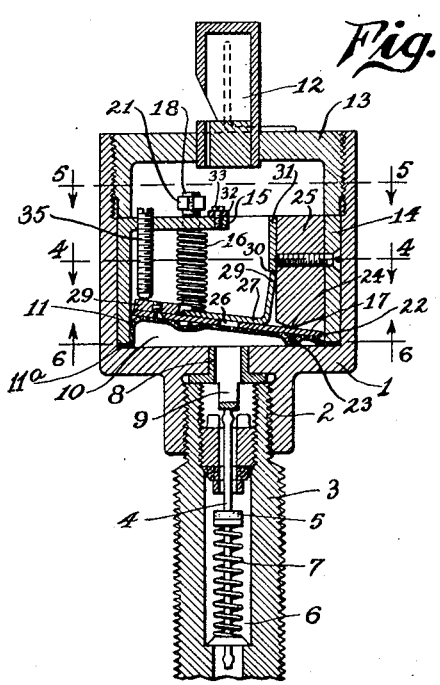
Fig.1.
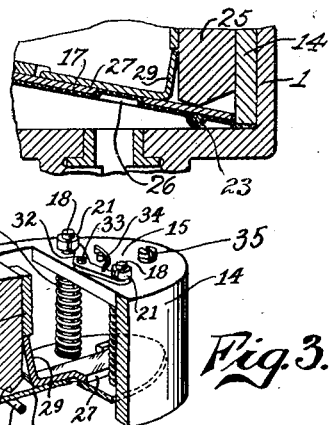
Fig.8.
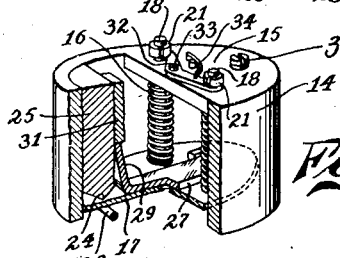
Fig.3.
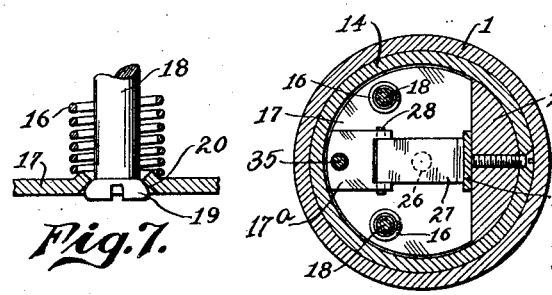
Fig.2.
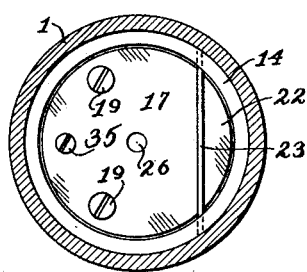
Fig.7.
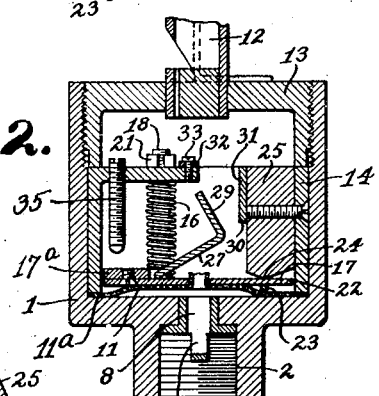
Fig.4.
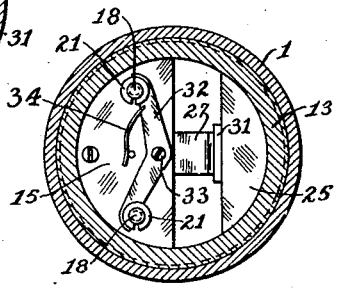
Fig.5.
Fig.6.
Inventor
George Reade Baldwin
By Lyon & Lyon
Attorneys Patented Dec. 17, 1929

1,739,568

UNITED STATES PATENT OFFICE

GEORGE READE BALDWIN, OF LOS ANGELES, CALIFORNIA

PRESSURE-ALARM DEVICE

Application filed September 22, 1928. Serial No. 307,700.

This invention relates to a pressure alarm device. Devices of this nature are employed in different situations to indicate substantial loss in pressure in a fluid held under a normal pressure in a container. While the invention can be used for any specific purpose, I have described it in the following specification as applied to an automobile tire to indicate when the pressure falls below a predetermined point, by puncture of the tire or otherwise, so that the car may be stopped in time to save the tire from injury by complete deflation.

One of the objects of the invention is to provide a construction which will be fluid-tight and leak-proof.

Another object of my invention is to provide a construction which will operate in such a way that when the pressure falls to a predetermined point, a considerable quantity of the air under pressure will burst forth to cause an effective signal.

Further objects of the invention will appear hereinafter.

The invention consists of novel parts and combination of parts to be described hereinafter, all of which contribute to produce an efficient pressure alarm device.

A preferred embodiment of the invention is described in the following specification, while the broad scope of the invention is pointed out in the appended claims.

In the drawing:

Figure 1 is a longitudinal section through a device embodying my invention and showing a portion of an inflating nipple and valve to which the device is attached. This view shows the parts in the relation which they have when the retained pressure is normal.

Figure 2 is a view similar to Figure 1, but omitting the inflating nipple and showing the parts in the relation which they have after the retained pressure has dropped below a predetermined point. This view shows the parts in the relation they have after the apparatus is operated to give the alarm.

Figure 3 is a perspective showing a portion of the mechanism broken away and partially in section.

Figure 4 is a cross section taken about on the line 4—4 of Figure 1.

Figure 5 is a cross section taken about on the line 5—5 of Figure 1 and particularly illustrating the latching means which I employ to inhibit the action of the spring means while the device is being attached to the nipple or duct that communicates with the container carrying the fluid under pressure.

Figure 6 is a cross section on the line 6—6 of Figure 1 looking upwardly, but with the diaphragm omitted.

Figure 7 is a section showing a detail of the preferred construction.

Figure 8 is a cross section view showing the closure support for the diaphragm under pressure.

In practicing the invention, I provide a hollow casing, the chamber within which is arranged for communication with the fluid in a fluid container. Within the casing I mount, detachably, a flexible diaphragm, so mounted that it will prevent the escape of fluid at the normal pressure. I provide means cooperating with the diaphragm in such a way as to cause its rupture upon a predetermined lessening of the fluid pressure, thereby allowing the fluid to escape through the ruptured diaphragm to operate the signal device.

In the present embodiment of the invention, I provide a hollow casing 1 having a threaded socket 2 at one end to facilitate its attachment to a duct leading from the container carrying fluid that is retained under pressure.

In the present instance, this socket is screwed on to the threaded end of an inflating nipple 3 of an automobile tire, said nipple carrying the valve 4 with a head 5 normally held on its seat by the pressure maintained in the duct 6 of the nipple. It is also provided with a small spring 7 that urges the valve onto its seat. At the bottom of the socket 2, I provide a bushing 8, the function of which is to open this valve when the casing is attached to the nipple. For this purpose, this bushing 8 is provided with a stirrup 9, the cross bar of which will strike the end of the valve stem and open the valve when the casing 1 has been screwed tight on the nipple.

Detachably fixed at the bottom of the casing 1, I provide a flexible diaphragm 11 and associated with this diaphragm, I provide means enabling it to support the fluid pressure existing in the duct 6, but operating to move when this pressure drops below normal. I also provide means associated with the diaphragm, operating to rupture the diaphragm when this occurs, and thereby liberating the fluid under pressure to permit the same to operate a signal, for example, a small whistle 12 attached to a removable head 13 in the outer end of the casing. In order to accomplish this, I provide a carrier 14 (see Figure 3) which is constructed to be placed within the casing under the head 13. This carrier carries the mechanism that cooperates with the diaphragm to obtain my effects.

To this end, the carrier 14 is of general tubular form to fit casing 1, and has an integral or fixed abutment 15 partly covering one end thereof. This abutment 15 carries spring means, such as two coil springs 16 opposing the fluid pressure exerted against the diaphragm and which will cause a forward movement of the diaphragm when said fluid pressure drops below that pressure exerted by said springs. I utilize this forward movement to effect the rupturing of the diaphragm. Any suitable means may be employed for this purpose, but in the present instance, I use a diaphragm 11 of frangible, flexible and impermeable material, usually rubber, and on its side opposite to the air pressure I provide a pressure supporting member or movable supporting plate 17 for said diaphragm in the form of a disc which extends across the inner end of the carrier 14. This disc 17 is guided by means of guide stems 18 (see Figures 1 and 7) so that it can move or swing backward or forward. Each stem is formed with a head 19 at its inner end received in a rudimentary socket 20 formed in the disc 17. (See Figure 7). This socket permits some freedom of movement of the stem in the opening at this point in the disc, and the outer end of each stem passes through the abutment 15 and carries a head 21 beyond the abutment which limits the inward movement of the stem and disc 17 by engagement with the abutment. Each of the coil springs 16 is disposed around one of these stems. The disc 17 may be mounted in any desired manner to permit it to move in the casing 1. In the present instance, the disc 17 has a rocking movement on rocking edge 24 of the fixed block 25 and said disc is held to this rocking edge by pin 23. (See Figure 6.)

In the present embodiment of the invention, the disc 17 is provided with an orifice 26 for the escape of fluid. Through this orifice the rupturing of the diaphragm 11 occurs. This diaphragm may be mounted in any suitable manner to enable it to be ruptured as a consequence of the movement of the supporting plate or disc 17 when the retained pressure falls. In the present instance, I provide a movable closure 27 on the outer face of the disc 17 that supports the diaphragm and prevents its rupture through the orifice 26 at normal pressures. This closure 27 is in the form of a door, the side edges of which are provided with pivots 28 (see Figure 4) to form a hinge with the part 17$^a$ secured to the outer side of the disc 17. The other end of the closure 27 is constructed to cooperate with latching means which, in the normal position of the disc 17, holds the closure 27 in position to close the orifice 26. In the present instance, the end of the closure 27, remote from the pivot 28, is bent at an angle to form a tail 29 to cooperate with a steel latch shoulder 30 on part 31 fixed to inner face of the part 25. (See Figure 1.)

One of the novel features of my invention is that the diaphragm 11 not only operates as a frangible member to become ruptured when the signal operates, but it cooperates with the casing in such a way that it forms an air-tight gasket preventing any leakage of the air through my device. For this purpose, the diaphragm 11 is in the form of a disc of rubber, the edge 11$^a$ of which is clamped between the inner face of the carrier 14 and the inner head of the casing 1.

Figure 1 illustrates the parts in their set relation, ready to operate. When in this position, the stirrup 9 will have opened the valve 4, so that the air under normal pressure is admitted to the space 10 and holds the diaphragm against the inner face of the supporting member or disc 17. The springs 16 are under compression and the supporting member or disc 17 is held against further backward movement by stop 35. If the pressure in the container, for example a tire, falls to a predetermined point, the springs 16 will have sufficient strength to extend themselves on account of the reduction of pressure in the space 10, thereby producing a rocking movement of the disc 17 on the rocking pin 23. This will disengage the end of the latch tail 29 from the shoulder 30, open the closure 27 and, when this occurs, the pressure will immediately force the diaphragm through the orifice 26, causing a rupture at this point. Figure 2 shows the parts after this rupture occurs. The liberated air will then blow the whistle or other signal 12.

It will be understood that the normal pressures are in excess of the operating pressures.

In operating this device, as shown herewith, it is necessary that the orifice 26 be kept closed by closure 27 at the time when the device is screwed on to the tire valve-stem 3 and the air pressure of the tire exerted; for if orifice be then open this normal air pressure will burst through the diaphragm. I therefore hold the disc 17 in the compressed position for the springs shown in Figure 1 by means hereafter shown, which position keeps closed the closure 27 by engaging latch 29. It will be noticed that the latch 29 is pivoted at 28 and also virtually pivoted at 23, and downward movement of disc 17 pivoted at 28 unlatches said closure.

If said closure be latched when normal pressure comes on, said pressure will hold disc 17 against the stop 35 and thus keep said closure latched until sufficient lowering of the air pressure allows the springs to act, push forward disc 17, unlatch closure, open orifice 26 and allow the rupture of said diaphragm through said orifice.

It will be seen that the strength of the springs determines the pressure at which the device operates.

The diaphragm is made sufficiently weak over the orifice to burst through said orifice when supporting closure is withdrawn. For instance, the normal pressure in a balloon tire is 40 lbs. per square inch. It is desired that the device operate and sound the alarm at one-half normal, or 20 lbs. per square inch. Therefore, the springs are designed with such strength to push forward disc 17 and open the closure at 20 lbs.

In order to keep closure 27 latched and disc 17 in position shown in Figure 1 or otherwise in a set position while awaiting use, I provide means for latching the springs 16 in compression temporarily. In other words, I provide means for inhibiting the action of the springs and constructed so that after the carrier is put in place, the springs can be restored to their operating condition. For this purpose, on the outer face of the abutment 15, I provide a spring-pressed double latch lever 32 (see Figures 3 and 5). This double lever is mounted to rock on a small pivot screw 33 and is provided with a spring 34 tending to move it in a direction to disengage it from under the heads 21. In setting the parts, I simply press inwardly or upwardly on the disc 17, thereby compressing the springs 16, and I then rotate the latch 32 to project its ends under the heads 21. This movement of the disc 17 will bring it into the inclined position (shown in Figure 1) with the latch tail 29 against the shoulder 30. After rotating the latch 32 under the heads 21, I then permit the springs 16 to extend themselves slightly. This permits the heads 21 to seat on the ends of the latch 32 and they hold the latch 32 in its latching position. (See Figure 3.)

After the parts have been set in this way, the carrier 14 is put into the casing 1 and the head 13 screwed down onto it to hold it and the diaphragm in place. When the casing is screwed onto nipple 3, the admission of the air under pressure into the space 10 through the operation of the stirrup 9 causes a slight backward movement of the disc 17 against stop 35 which, however, is sufficient to move the heads 21 away from the latch 32, whereupon the spring 34 swings the latch away from the stems 18.

The movement of the latch 32 away from the heads 21 permits the subsequent rocking movement of the disc 17 by the springs when the pressure in the tire falls, also permits the opening of the closure, the rupture of the diaphragm, and the sounding of the alarm.

In Figure 1, the flexible rubber diaphragm is shown hugging the contours of space 10 caused by the air pressure. The cross section at 5—5 may of course be circular, square, oval or any shape.

It can be seen that the purpose for moving the disc 17 is to unlatch the closure mounted upon said disc. This can be done by moving the disc directly forward like a piston.

In Figure 1 the diaphragm 11 is illustrated so that it is not projected by the pressure into the orifice 26. The device has been illustrated in this way for the sake of clearness. However, when the diaphragm is under the influence of the retained fluid under pressure, it will be pressed up into the orifice as illustrated in Figure 8.

It is understood that the embodiment of the invention described herein is only one of the many embodiments this invention may take, and I do not wish to be limited in the practice of the invention, nor in the claims, to the particular embodiment set forth.

What I claim is:

1. In a pressure alarm for indicating decrease in fluid pressures, the combination of a hollow casing arranged for fluid communication with the fluid in a fluid container, a flexible diaphragm detachably fixed in said casing, said flexible diaphragm being flexed in response to a decrease in fluid pressure, and said diaphragm arranged to prevent the escape of fluid at normal pressures, a signal device, and means operated by lessening the fluid pressure for causing the rupture of said diaphragm to allow the fluid to escape through the ruptured diaphragm to the signal device and operate said signal device.

2. In a pressure alarm for indicating decrease in fluid pressures, a hollow casing arranged for fluid communication with the fluid in a fluid container, a flexible diaphragm detachably fixed in said casing and arranged to prevent the escape of fluid at normal pressures, a movable member operated by the fluid pressures, a signal device, and means operated by lessening the fluid pressure for causing the rupture of said diaphragm to allow the fluid to escape through the ruptured diaphragm to the signal device and operate said signal device.

3. In a pressure alarm for indicating decrease in fluid pressures, a hollow casing arranged for fluid communication with the fluid of a fluid container, a flexible diaphragm detachably fixed in said casing, said diaphragm arranged to prevent the escape of fluid at normal pressures, a movable member supporting said diaphragm against the fluid pressure, and operated by the fluid pressures, a signal device, and means operated by lessening the fluid pressure for causing the rupture of said diaphragm to allow the fluid to escape through the ruptured diaphragm to the signal device and operate said signal device.

4. In a pressure alarm for indicating a decrease in fluid pressure, the combination of a member having an orifice for escape of the fluid, a frangible member covering the orifice, a movable closure for the orifice with means for holding the same in a position to close the said orifice, and means cooperating with the closure to release the same when the retained pressure decreases to a predetermined point, thereby permitting the retained pressure to rupture the frangible member.

5. In a pressure alarm for indicating a decrease in fluid pressure, the combination of a member having an orifice for escape of the fluid, a frangible member covering the orifice, a pivot latch with means for holding the same against the orifice to close it and means cooperating with the pivoted plate to release the same when the retained pressure decreases to a predetermined point, thereby permitting the retained pressure to rupture the frangible member.

6. In an audible pressure alarm for indicating a decrease in pressure in a container carrying fluid under pressure, the combination of a member having an orifice therethrough for escape of the fluid, a frangible member covering the orifice, a closure movably mounted on said member with means for holding the same in a position closing the said orifice and means including a spring cooperating with the closure to release the same when retained pressure decreases to a predetermined point, thereby permitting the retained pressure to rupture the frangible member.

7. In an audible pressure alarm for indicating a decrease in pressure in a container carrying fluid under pressure, the combination of a casing, a movable member mounted in the casing supporting the pressure of the retained fluid and having an orifice for escape of the fluid, a frangible member covering the orifice, a movable closure carried by said member for closing the orifice, means cooperating with the closure to hold the same in its closed position and spring means urging said movable member in a direction to oppose the fluid pressure operating to move the movable member and thereby release the closure when the retained pressure decreases to a predetermined point, to permit the retained pressure to rupture the frangible member.

8. In a pressure alarm for indicating a decrease in pressure in a container carrying fluid under pressure, the combination of a casing, a pressure supporting member movably mounted in the casing and exposed on one side to the fluid pressure, said member having an orifice therethrough, spring means urging the movable member in a direction to oppose the fluid pressure, a movable closure for the orifice with latching means cooperating with the closure to release the closure when the pressure decreases and the spring means moves said pressure retaining member.

9. In a signal device for indicating a decrease in pressure in a container carrying fluid under pressure, the combination of a casing, a pressure supporting member movably mounted in the casing and exposed on one side to the fluid pressure, said member having an orifice therethrough, spring means urging the movable member in a direction to oppose the fluid pressure, a movable closure for the orifice with latching means cooperating with the closure to release the closure when the pressure decreases and the spring means moves said pressure retaining member and a frangible member covering the said orifice and operating to blow out when the closure is released from the orifice.

10. In an audible signal device for indicating a decrease in pressure in a container carrying fluid under pressure, the combination of a casing, a pressure-supporting member exposed on one side to the retained pressure and having an orifice for the escape of the fluid, a frangible diaphragm mounted in the casing covering the orifice and operating as a gasket to retain the fluid pressure, a movable closure for the orifice, spring means cooperating with the pressure-supporting member and opposing the pressure of the retained fluid, and latching means cooperating with the movable closure and operating to release the same when the spring means move the retaining member upon a decrease in the retained pressure.

11. In an audible signal device for indicating a decrease in pressure in a container carrying fluid under pressure, and having a duct with a valve leading therefrom, the combination of a casing with means for attaching the same to the said duct, a pressure supporting member exposed on one side to the retained pressure and having an orifice for the escape of the retained fluid, a frangible diaphragm mounted in the casing covering the orifice and operating as a gasket in the casing to retain the fluid pressure, a movable closure for the orifice, spring means cooperating with the pressure retaining member and supporting the pressure of the retained fluid, latching means cooperating with the movable closure, and operating to release the same when the spring means move the retaining member upon a decrease in the retained pressure, and means for temporarily inhibiting the action of the spring means when attaching the said casing to the duct.

12. In a pressure alarm for indicating a decrease in pressure in a container carrying fluid under pressure, the combination of a casing, a pressure supporting member movably mounted in the casing and exposed on one side to the fluid pressure, said member having an orifice therethrough, spring means urging the movable member in a direction to oppose the fluid pressure, a movable closure for the orifice with latching means cooperating with the closure to release the closure when the pressure decreases and the spring means moves said pressure retaining member, and a spring actuated dog cooperating with the spring means to inhibit the same temporarily when the casing is being attached to the duct and operating to release itself from the spring means when the pressure retaining member becomes exposed to the retained pressure by the opening of the value duct.

13. In a pressure alarm for indicating decrease in pressure in a retained fluid, the combination of a casing through which the retained fluid may escape, a flexible diaphragm in said casing operating as a gasket to retain the fluid under pressure, movable means cooperating with the flexible diaphragm to support the normal fluid pressure and operating to effect the rupture of the diaphragm when the retained pressure falls below a predetermined point and thereby permit escape of the fluid through the ruptured diaphragm.

14. In a pressure alarm for indicating decrease in fluid pressures, the combination of a hollow casing, a movable member in said casing having an orifice for the escape of the fluid, a frangible member covering said orifice to prevent the escape of said fluid at normal pressures, and means for rupturing said frangible member to allow the escape of said fluid upon a predetermined lowering of the fluid pressure.

15. In a device of the kind described, a body, a diaphragm for retaining fluid under pressure, and automatic means operating to burst the diaphragm actuated upon a pre-determined pressure in said device.

Signed at Los Angeles, California this 15 day of Sept., 1928.

GEORGE READE BALDWIN.